Aug. 15, 1944. S. G. KOTELEV ET AL 2,355,918
RECONNAISSANCE AND ATTACK BUOY FOR SUBMARINES
Filed March 30, 1943 8 Sheets-Sheet 2

SERGE G. KOTELEV
SOPHIE F. KOTELEV
INVENTORS

BY
John P. Wilsnow
ATTORNEY

SERGE G. KOTELEV
SOPHIE F. KOTELEV
INVENTORS

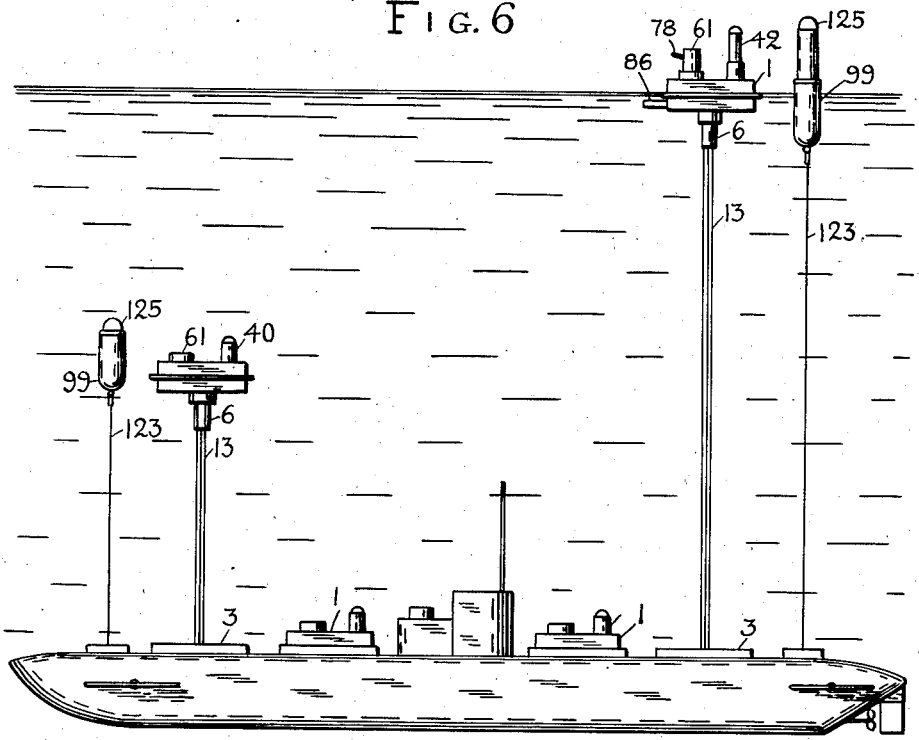
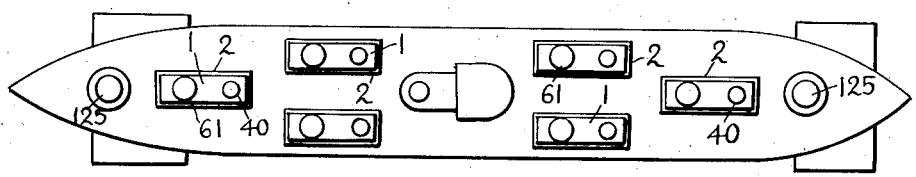
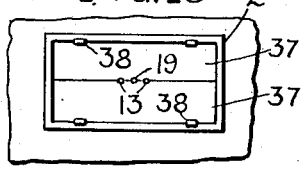
SERGE G. KOTELEV
SOPHIE F. KOTELEV
INVENTOR
BY John P. Nikonow
ATTORNEY

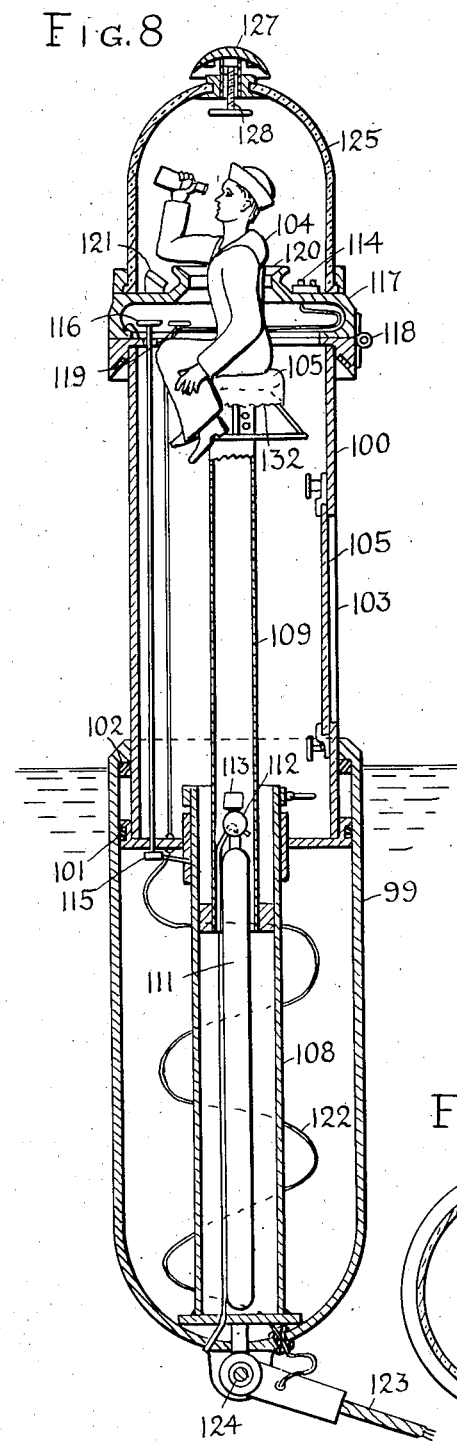
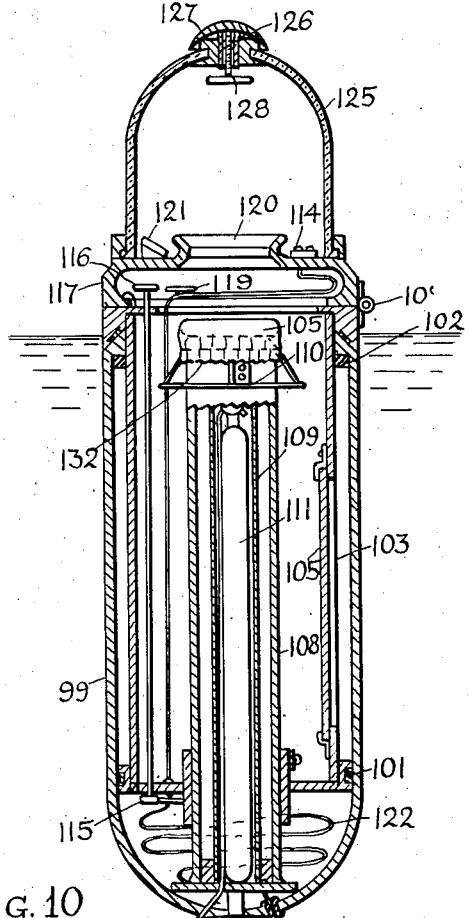
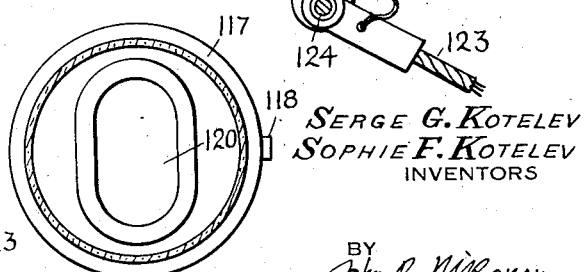

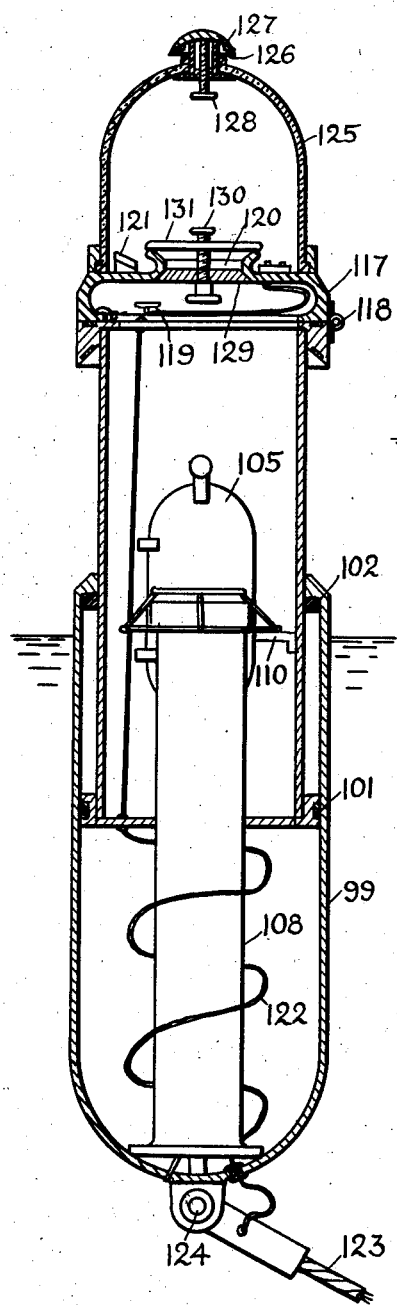
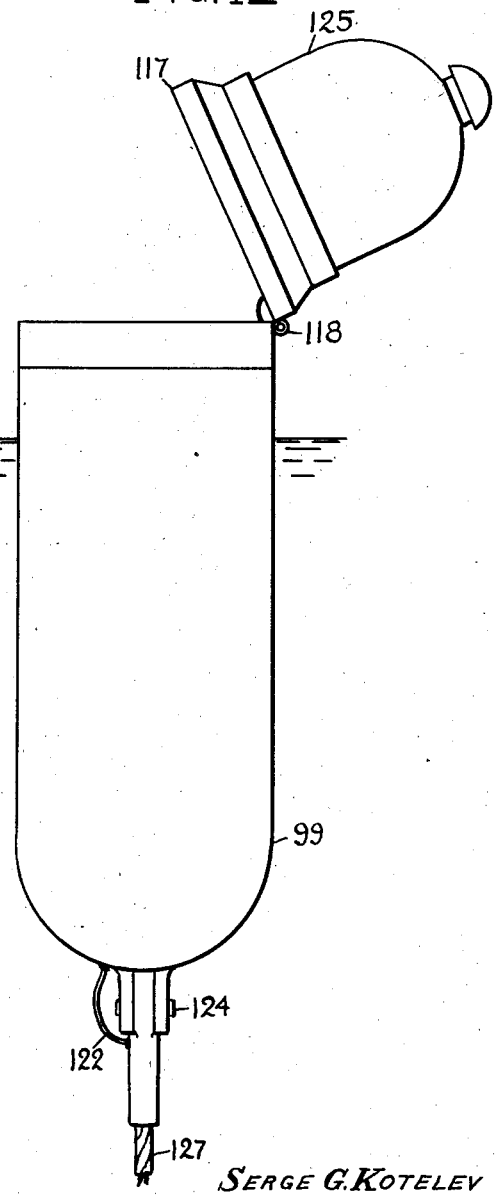

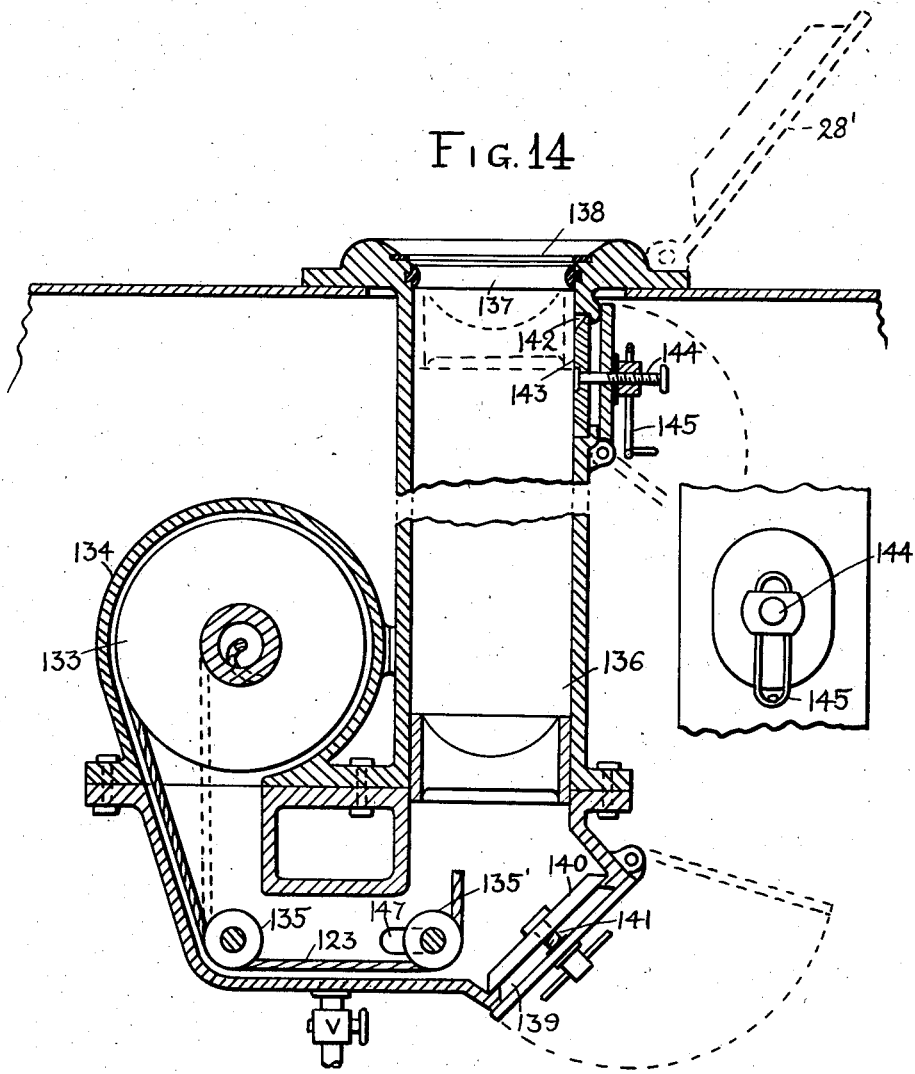

Patented Aug. 15, 1944

2,355,918

UNITED STATES PATENT OFFICE 2,355,918

RECONNAISSANCE AND ATTACK BUOY
FOR SUBMARINES

Serge G. Kotelev and Sophie F. Kotelev,
Long Island City, N. Y.

Application March 30, 1943, Serial No. 481,166

7 Claims. (Cl. 114—16.7)

Our invention relates to reconnaissance buoys for submarines and has particular reference to captive buoys which can be released from a submerged submarine.

The object of our invention is to provide a buoy which can be normally carried in a special recess or well in the hull of a submarine, means being provided to admit a member of the submarine crew into the buoy while the submarine is submerged, the buoy being adapted to be released on a cable so that it can rise to the surface.

Another object of our invention is to provide on the buoy a tubular telescopic tower which can be raised by the observer in the buoy, the tower being provided with a transparent dome for the observer. We also provide for the observer a seat in the tower which can be raised with the tower.

We also provide means to seal the top of the tower if the dome is broken, the sealing means or closure being normally stored on top of the seat under a special cover.

Another object of our invention is to provide an air valve on top of the dome which can be closed when the buoy is submerged.

Another object of our invention is to provide the buoy with torpedo tubes which can be placed in firing position by the operator inside for firing torpedoes. We also provide means to turn the buoy on its vertical axis by a special small propeller mounted in a telescopic casing. The buoy is further provided with a telescopic tower having a gun on an articulated bracket so that the gun can be moved in any desired position and can be raised for anti-aircraft fire.

Another object of our invention is to provide means in the submarine for winding and unwinding the cable on which the buoy is held, the cable winding device being water-tight. A suitable recess is provided in the hull of the submarine for the buoy, means being provided to close the recess when the buoy is released for floating to the surface of water.

Our invention is more fully described in the accompanying specification and drawings in which—

Fig. 6 is a view of a submarine with our buoys;

Fig. 7 is a plan view of the same;

Fig. 8 is a view of a reconnaissance buoy at the surface of water;

Fig. 9 is a similar view of the buoy in a closed position;

Fig. 10 is a detail view of a closure at the top of the buoy;

Fig. 11 is a sectional view of the buoy in a partly closed position;

Fig. 12 is an elevational view of the buoy with the dome open;

Fig. 13 is a plan view of well without the buoy;

Fig. 14 is a sectional elevational view of a well in the submarine for the buoy.

Figure 1:
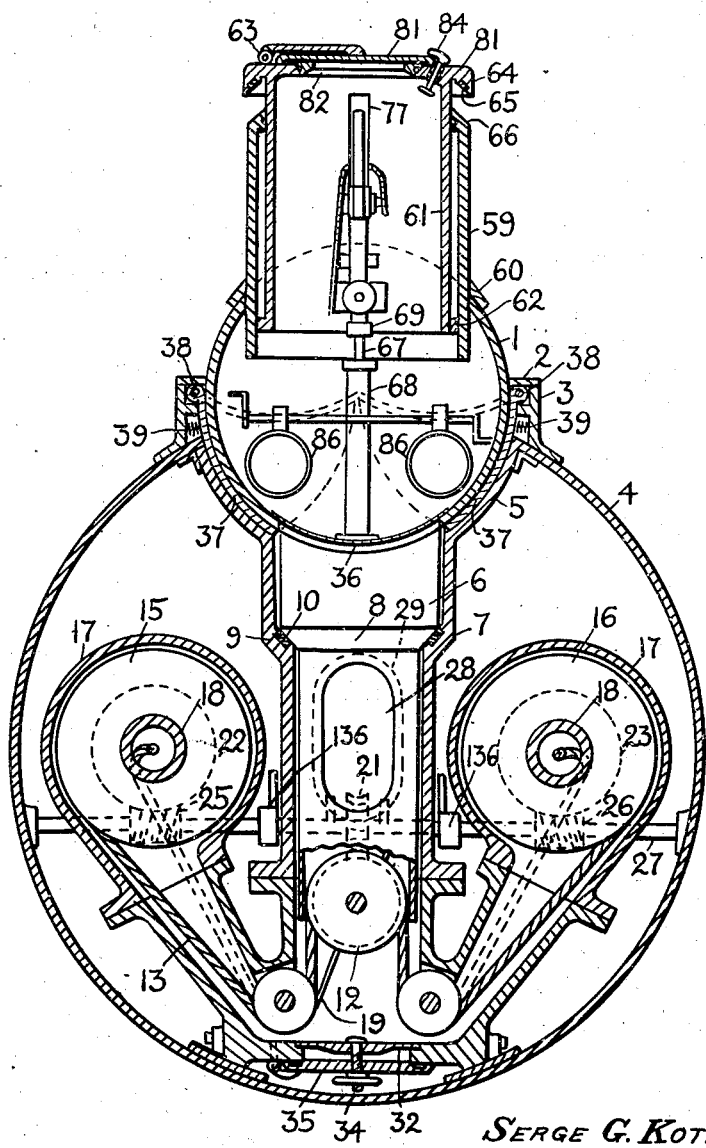
Fig. 1 is a transverse sectional view of a submarine with our buoy.

Our buoy as shown in Figs. 1, 2, 3, 4 and 5, consists of an elongated cylindrical body 1 with flanges 2 at the side resting on raised flanges 3 on the hull of a submarine 4, the lower portion of the body 1 being held in a well or recess 5. The body 1 has a tubular extension 6 at the bottom, fitted into a tubular well 7. A tapering shoulder 8 on the extension engages corresponding shoulder 9 in the well. Resilient gaskets 10 are provided in the shoulders for preventing leakage of water past the shoulders.

The lower end of the tubular extension 6 is provided with a pulley 12 for a cable 13, the extension 6 being sealed above the pulley by a partition 14. The ends of the cable are wound on drums or reels 15, 16, rotatively supported in casings 17 at the sides of the well 7. The casings are in communication with the well 7 but are sealed from the interior of the submarine. Shafts 18 of the drums are hollow, the ends of the cable passing through these shafts into the submarine. An electric cable 19 extends with the cable 13 for supplying power to the interior of the buoy, also for telephones and other signaling devices. The drums are rotated in the opposite directions by an electric motor 20 through worm gears 21, 22, 23, worms 24, 25, 26, and a shaft 27. Thus both cable portions are wound or unwound simultaneously for raising or lowering the buoy.

Figure 2:
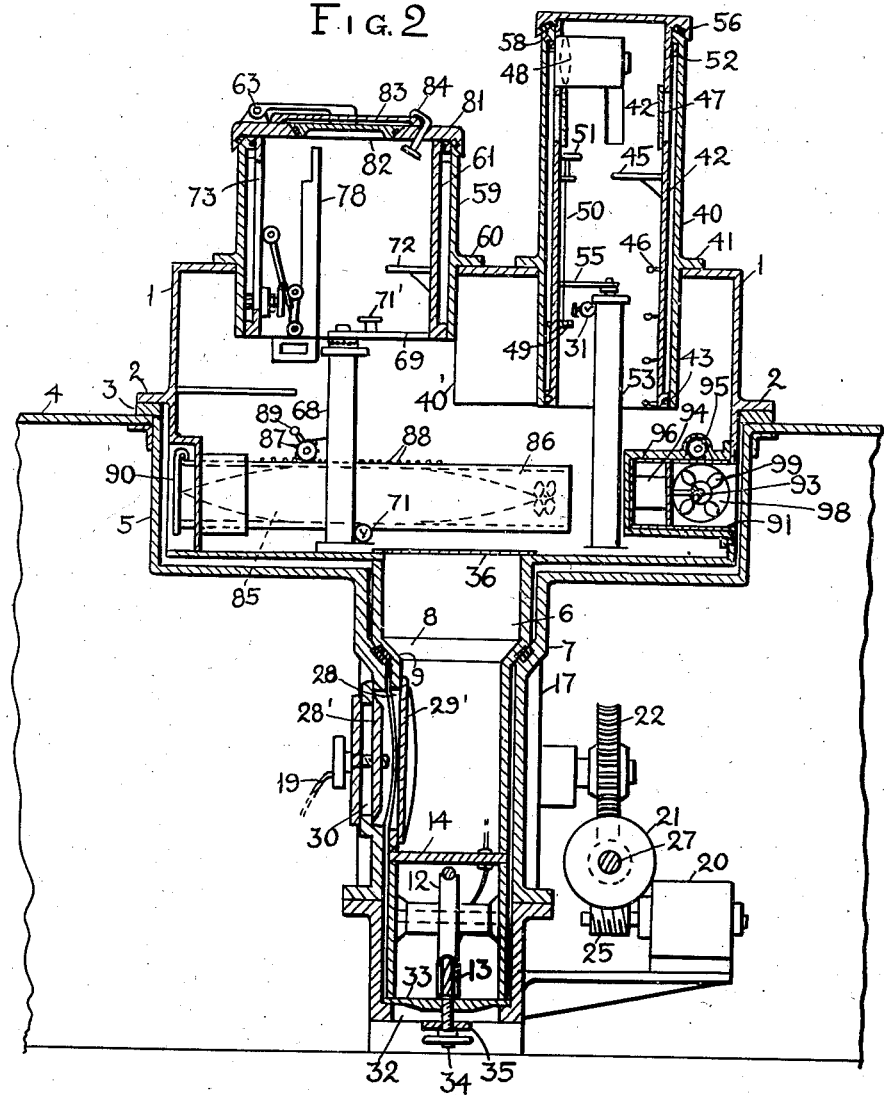
Fig. 2 is a longitudinal sectional view of the same.

The extension 6 is provided with a port 29 for admitting a man into the buoy, the port being closed by a lid 29. A corresponding port 30, Fig. 2, is provided in the tubular well 7 opposite the port 28, which is usually closed by a lid 28'.

An oval inspection opening 32 is provided at the bottom of the well 6, closed by a lid 33 and drawn tightly by a bolt 34 with a brace 35.

The buoy is automatically released from its seat when the motor 20 turns the drums for unwinding the cable. The buoy then rises to the surface of water by its buoyance as shown in Fig. 6. Upon completion of the task assigned to the man or men in the buoy, the latter is drawn back into the well 7 and the men pass into the submarine through the ports 28, 30. The opening at the top of the extension 6 is usually closed by a lid 36.

It is important that the well should remain free from any obstruction while the buoy is at the surface of water. Particular care should be taken that no marine animals should become lodged in the well, thus preventing the buoy from properly resting on the water-tight shoulder 10. For this purpose covers or shutters 37 are provided, hinged at 38 to the flanges 3 and curved to suit the outer curvature of the body 1 as shown in Fig. 1. Springs 39 force the covers upward into positions indicated with dotted lines in Fig. 1 when the buoy is released. The covers are shown in Fig. 13 in a raised position.

To facilitate free rising of the buoy, a freewheeling clutch may be included in the transmission from the motor 21 to the drums 15, 16.

The buoy is provided with two towers, one for observation, the other for attack. The observation tower represents a tube 40 fastened to the body 1 as by flanges 41. A telescopically sliding inner tube 42 is fitted in the outer tube 40, being sealed by packing 43, 44. A seat 45 is provided in the inner tube for an observer, with rungs 46 at the side of the tube for climbing to the seat. Glass windows 47 are fitted in slots in the inner tube to enable the observer to see in every direction. An electric searchlight 48 may be also provided in the inner tube. The tube may be rotated by the observer, for which purpose a pinion 49 is provided at the end of a rod 50 with a handwheel 51 within reach of the observer, the pinion engaging a ring gear 52 at the upper end of the outer tube 40. The pinion engages the gear only when the inner tube is fully raised.

A hydraulic cylinder 53 is mounted on the floor of the body 1 under the tube 40 for raising the inner tube 42. A plunger 54 is attached at the top to a lug 55 extending from the side wall of the tube 42. A suitable control valve 31 is provided for connecting the cylinder with a source of compressed fluid 40'.

Figure 3:
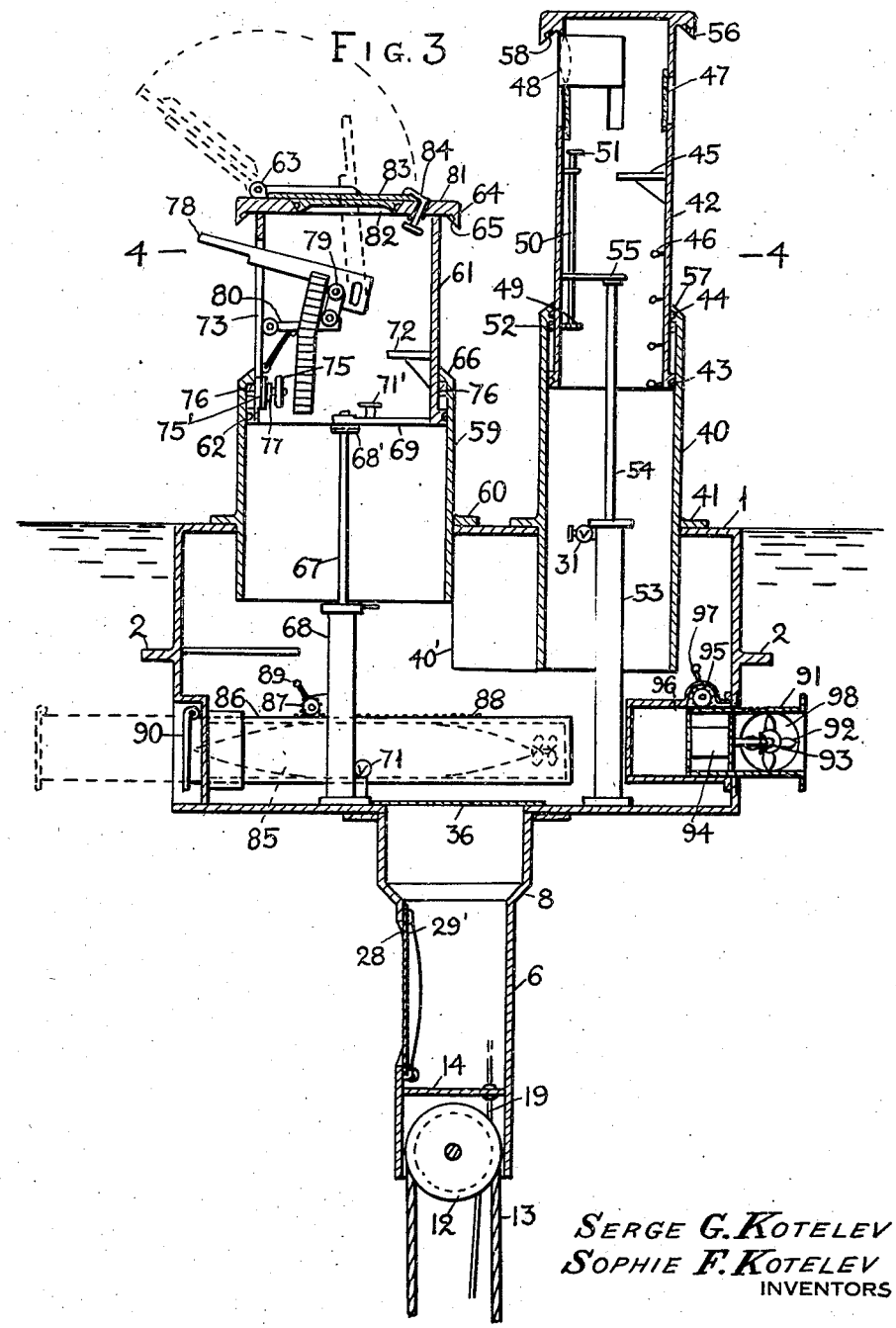
Fig. 3 is a longitudinal sectional view of the buoy released from the submarine and floating on the surface of water.
Figure 4:
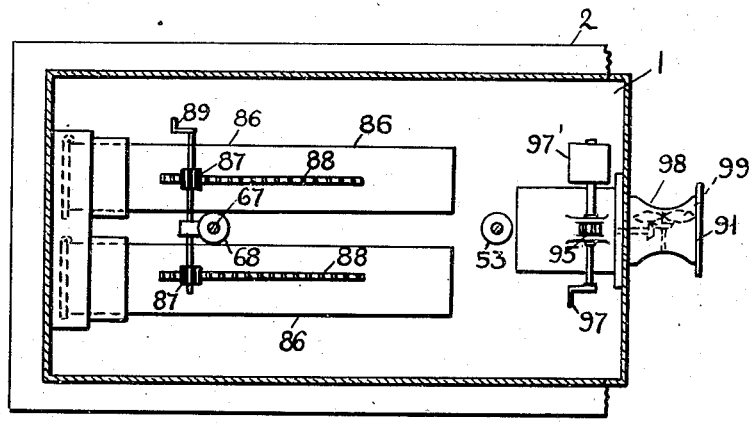
Fig. 4 is a longitudinal sectional view of the buoy.
Figure 5:
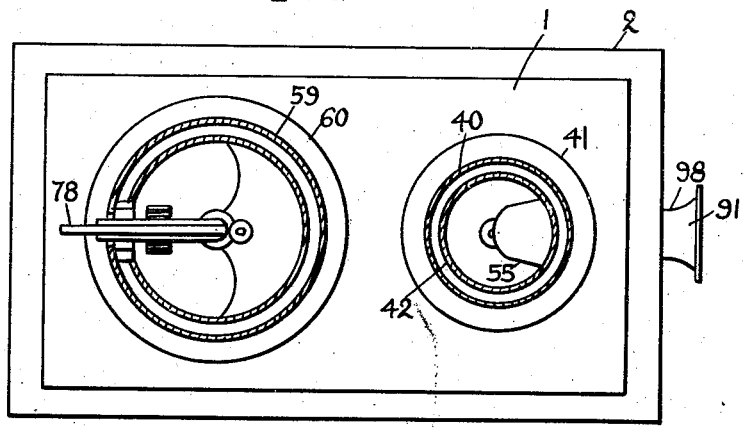
Fig. 5 is a similar view taken on the line 4—4 of Fig. 3.

The tower is shown in a raised position in Fig. 3 and is lowered in Fig. 1. When lowered, a tapering flange 56 at the top of the inner tube 42 engages a tapering shoulder 57 on top of the outer tube 40. A rubber sealing insert 58 ensures a water-tight junction.

The attack tower comprises a stationary outer tube 59 fastened to the body 1 as by a flange 60. An inner tube 61 slides telescopically in the outer tube and is sealed by a ring 62. A flange 64 with a rubber insert 65 engages a tapering shoulder 66 of the outer tube when the inner tube is lowered, the ring forming a water-tight junction.

The inner tube is raised by a plunger 67 sliding in a hydraulic cylinder 68 and supported by a ball bearing 68' a lug 69 extending from the inner wall of the tube 61. A control valve 70 is located at the foot of the cylinder for admitting compressed fluid into the cylinder, an exhaust valve 71 being provided with a control pedal 71' near the seat 72 for an operator in the tower. For rotating the tower, a pinion 74 with a handwheel 75 in a bracket 75' is slidably fitted in a slot 73 in the wall of the inner tube 61, the pinion engaging a ring gear 76 at the upper end of the outer tube when the inner tube is fully raised. A clamping nut 77 tightens the bracket in an operative position in the slot.

A machine gun 78 or other suitable type of a gun is mounted on an articulated bracket 79, sliding on a rail 80 hinged at the inner wall of the tube 61, the gun extending through the slot 77. The gun when not in use is lowered into a position shown in dotted lines in Fig. 3.

The gun can be also raised for firing through the top as an anti-aircraft weapon. The top plate 81 of the inner tube is provided for this purpose with an opening 82 normally closed by a lid 83 hinged at 63, held fast by a locking bolt 84. The latter can be released from inside the tube by the gunner and the lid thrown open as shown in dotted lines in Fig. 3.

Another powerful weapon is provided in the form of torpedoes 85 in torpedo tubes 86 in the lower portion of the body 1. The tubes can be moved outward by pinions 87 engaging racks 88 on the tubes and operated by handles 89 or by a suitable motor, electric, hydraulic or using compressed air. The latter is stored in a suitable reservoir primarily for expelling torpedoes from the tubes. Hinged lids 90 at the ends of the tubes are automatically raised under pressure from the torpedoes when the latter are expelled from the tubes.

For accurately steering or turning the body 1 in the water for pointing the torpedoes in a desired direction a power device is employed consisting of a telescopic tube 91 fitted in the end wall of the body 1 and provided with a propeller 92 on a shaft 93 operated by a motor 94. A pinion 95 engages a rack 96 on the tube and can be manually operated by a handle 97 rotated by a motor 97'. The tube 91 has openings 98 at the sides for exposing the propeller to the outside water. Rotation of the motor 94 in one or the other direction will cause the body 1 to turn in a corresponding direction.

Several such attack buoys can be mounted on the submarine as shown in Figs. 6, and 7, in which one buoy is shown raised and in an attacking position with the towers or inner tubes fully raised, the other buoy is partly raised, and others are still resting in their wells on the submarine.

If the buoy is damaged and cannot be used, it may be detached by unwinding the cables and releasing their inner ends.

Another type of buoy is shown in Figs. 8 to 14 inclusive. The buoy consists of an outer tubular member 99 with telescopically fitted inner tubular member 100, rings 101, 102, forming water-tight seals. The inner member is provided with a port 103 for admitting an observer 104 inside, the port being closed by a door 105.

The inner cylinder is raised hydraulically, for which purpose a cylinder 108 is mounted in the outer cylinder with a hollow plunger 109 inside. The top of the plunger is connected with the inner cylinder by cross-bars 110. A bottle 111 with a fluid under pressure is placed inside the plunger and is provided with a two-way valve 112, operated by a magnet 113 controlled by push buttons 114 at the top of the inner cylinder 100. A seat 115 is mounted on top of the plunger 109 on ball bearings for the observer, the observer being able to turn the seat around in any direction. A lock or brake 115 is provided at the side of the plunger for locking the latter in the raised position, the lock being operated by a handle 116 at the top.

A top piece 117 is mounted on top of the inner member 100, being hinged at 118 and locked in place from the inside by a latch 119. An oval opening 120 is provided in the top piece for the observer as shown in Fig. 8. A telephone 121 and similar signal devices are provided on the top piece with cables or wires 112 extending downward into a cable 123 attached to a swivel 124.

A dome 125 is mounted on the top piece 117 made of glass or other transparent material and is provided with an air valve 126 on top. The valve has a cover 127 and a screw 128 for closing the valve when the device is under water.

The opening 120 can be closed in the event that the dome 125 is broken or damaged. A lid 129 is provided for this purpose as shown in Fig. 11, tightened by a screw 130 and a clamping bar 131. The lid and the bar are ordinarily held on top of the seat 115 under a seat cover 132. Foot rails 132' are provided under the seat.

The dome 125 can be opened as shown in Fig. 12 if the observer wishes to leave the buoy. He can reenter the same upon completion of his task and close the dome after him. He can then lower the inner tube with the seat and signal the attendants in the submarine to pull him down.

The cable is wound on a drum 133, Fig. 14, inside a water-tight casing 134. Pulleys 135, 135', guide the cable into a tubular well 136 for the buoy. A soft resilient ring 137 is provided in the outer opening of the well to protect the sides of the buoy when the latter is pulled into the well by the cable. A port 139 at the bottom is used for removing or inserting the buoy into the well, the port being closed by a lid 140 with a screw 141. A similar port 142 is provided at the side, closed by a lid 143 with a screw 144. An oval ring-shaped handle 145 is provided on the screw for its operation. The port is used for admitting the operator into the buoy. The shaft of the pulley 135' is fitted in a slot 147 so that the pulley can be moved back to make room for inserting or removing the buoy.

A saddle 106 is slidably fitted in the well 136 for supporting the round lower end of the buoy. The saddle rises to the top of the well when the buoy is raised, closing the well.

A double cable as shown in Fig. 1, can be also used for buoy 99. One drum at a time can be operated if desired, the other drum being disconnected by a clutch 146.

A cover 28' may be provided of a type similar to the cover disclosed in our copending patent application, Serial No. 443,142, filed May 15, 1942, Patent No. 2,341,923.

It is understood that our reconnaissance and attack buoys for submarines may be further modified without departing from the spirit of the invention, as set forth in the appended claims.

We claim as our invention:

1. A reconnaissance buoy for a submarine comprising a vessel; a tubular container opened at the top supported on the upper deck of a submarine and adapted to receive the vessel; a cable extending from the vessel into the submarine; a drum for the cable; means to admit a man from the submarine into the vessel; means to release the vessel; means to rotate the drum for unwinding the cable and permitting the vessel to rise to the surface of water; a water-tight enclosure for the drum at the container; means to prevent outside water from entering the submarine when the vessel is released; a hinged cover at the top of the container adapted to be depressed by the vessel when the latter is resting in the container; and means to raise the cover for closing the container when the vessel is released therefrom.

2. A reconnaissance buoy for a submarine comprising a vessel; a tubular container opened at the top supported on the upper deck of a submarine and adapted to receive the vessel; a cable extending from the vessel into the submarine; a drum for the cable; a water-tight enclosure for the drum in communication with the container; the container having an opening; the container and the vessel having registering openings for admitting a man from the submarine into the container; water-tight doors for the openings; means to rotate the drum thereby releasing the cable and allowing the vessel to rise to the surface of water; the bottom of the container having an opening for inserting the vessel into the container from inside the submarine; and a water-tight cover for the bottom opening.

3. A reconnaissance buoy for a submarine comprising a water-tight vessel elongated in horizontal direction; a container for the vessel at the upper deck of a submarine open at the top; a tubular extension at the bottom of the vessel slidably fitted in a corresponding tubular recess in the container; a cable extending from the extension into the submarine; a drum for the cable; a water-tight enclosure for the drum and cable at the container; the tubular extension and walls of the recess having ports for the passage of a man; water-tight covers for the ports; torpedo tubes slidably fitted in the vessel; and means to yieldably close the openings in the tubes when the tubes are withdrawn into the vessel.

4. A reconnaissance buoy for a submarine comprising a water-tight vessel elongated in horizontal direction; a container for the vessel at the upper deck of a submarine open at the top; a tubular extension at the bottom of the vessel slidably fitted in a corresponding tubular recess in the container; two cables extending from the bottom of the extension into the submarine; two water-tight enclosures in communication with the tubular extension; drums in the enclosures for the cables; means to simultaneously rotate the drums for releasing the cables and allowing the vessel to rise to the surface of water; means to close the container when the vessel is released; and observation posts at the top of the vessel.

5. A reconnaissance buoy for a submarine comprising a water-tight vessel; means to support the vessel at the submarine; means to admit a man from the submarine into the vessel under water; cables connecting the vessel with submarine for raising and lowering the vessel; a cylindrical cabin on top of the vessel; means to raise and to lower the cabin; a gun in the cabin; a folding rotatable bracket for the gun, the cabin having openings at the side and at the top for the gun; and means to seal the openings when the cabin is lowered.

6. An observation buoy for a submarine comprising a tubular body; means to support the body in a recess in a submarine; a cable extending from the body into the submarine; means to raise and lower the buoy by the cable; a telescopic tubular extension on the body; means to raise and to lower the extension; an air valve on top of the extension; a seat for an observer in the extension; means to render the body with the extension water-tight; a telescopic tubular post supporting the seat in the body; a container for a fluid under compression in the post; and means at the top of the vessel to control the fluid for raising and lowering the seat.

7. A reconnaissance buoy for a submarine comprising a water-tight vessel; means to support the vessel at the submarine; means to admit a man from the submarine into the vessel under water; cables connecting the vessel with submarine for raising and lowering the vessel; a telescopic tubular extension at the side of the vessel; a propeller in the extension; and means to operate the propeller for rotating the vessel when the vessel is raised to the surface of water.

SERGE G. KOTELEV.
SOPHIE F. KOTELEV.